United States Patent
Song et al.

(10) Patent No.: US 12,477,540 B2
(45) Date of Patent: Nov. 18, 2025

(54) APPARATUS AND METHOD FOR SUPPORTING OPERATOR-SPECIFIC SERVICE IN WIRELESS ACCESS NETWORK

(71) Applicant: SAMSUNG ELECTRONICS CO., LTD., Suwon-si (KR)

(72) Inventors: Junhyuk Song, Suwon-si (KR); Jeongyeob Oak, Suwon-si (KR); Chungkeun Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 485 days.

(21) Appl. No.: 17/749,978

(22) Filed: May 20, 2022

(65) Prior Publication Data
US 2022/0279498 A1 Sep. 1, 2022

Related U.S. Application Data

(63) Continuation of application No. PCT/KR2020/016621, filed on Nov. 23, 2020.

(30) Foreign Application Priority Data

Nov. 22, 2019 (KR) .................. 10-2019-0151746

(51) Int. Cl.
  *H04W 72/20* (2023.01)
  *H04W 4/50* (2018.01)
  (Continued)

(52) U.S. Cl.
  CPC ............. *H04W 72/20* (2023.01); *H04W 4/50* (2018.02); *H04W 88/12* (2013.01); *H04W 88/18* (2013.01)

(58) Field of Classification Search
  CPC .. H04W 24/02; H04W 92/12; H04W 36/0066
  (Continued)

(56) References Cited

U.S. PATENT DOCUMENTS 6,049,545 A  4/2000 Stephenson et al.
7,454,474 B2 * 11/2008 Choi ............... H04L 69/161
                                             709/217
(Continued)

FOREIGN PATENT DOCUMENTS

EP  4050967 A1 *  8/2022 ............ H04W 72/20
EP  4050967 A4 * 12/2022 ............ H04W 24/02
(Continued)

OTHER PUBLICATIONS

Czichy, 5G RAN optimization using the O-RAN software community's RIC (RAN Intelligent Controller), ONS Europe, Sep. 23, 2019, 23 pages.
(Continued)

*Primary Examiner* — William D Cumming
(74) *Attorney, Agent, or Firm* — NIXON & VANDERHYE P.C.

(57) ABSTRACT

A method in an apparatus configured to use an interface between a radio access network intelligent controller (RIC) and a node including a base station operates in a radio access network; comprises: generating first information associated with an RIC service; generating second information indicating a type of message to be used for transmitting the first information; and transmitting a message including the first information and the second information.

18 Claims, 11 Drawing Sheets

(51) Int. Cl.
*H04W 88/12* (2009.01)
*H04W 88/18* (2009.01)

(58) Field of Classification Search
USPC .................................. 455/439, 442
See application file for complete search history.

(56) References Cited

U.S. PATENT DOCUMENTS

| | | | | |
|---|---|---|---|---|
| 7,983,676 | B2* | 7/2011 | Ju | ................. H04W 36/0066 |
| | | | | 455/442 |
| 2004/0039744 | A1* | 2/2004 | Choi | ................. H04L 69/161 |
| 2008/0242304 | A1* | 10/2008 | Ju | ................. H04W 36/0066 |
| | | | | 455/439 |
| 2013/0182844 | A1 | 7/2013 | Nagai et al. | |
| 2016/0087858 | A1 | 3/2016 | Musfeldt et al. | |
| 2016/0149779 | A1 | 5/2016 | Sampath et al. | |
| 2016/0162858 | A1* | 6/2016 | Winograd | ............ G06Q 20/1235 |
| | | | | 705/51 |
| 2018/0007580 | A1 | 1/2018 | Kang et al. | |
| 2020/0067940 | A1* | 2/2020 | Salkini | ................. H04W 12/64 |
| 2020/0236528 | A1 | 7/2020 | Lee et al. | |
| 2021/0051567 | A1* | 2/2021 | Griot | ................. H04L 67/12 |
| 2022/0225264 | A1* | 7/2022 | Song | ................. H04W 8/00 |
| 2022/0279498 | A1* | 9/2022 | Song | ................. H04W 24/02 |
| 2024/0064793 | A1* | 2/2024 | Ashour | ................. H04W 28/26 |
| 2024/0276188 | A1* | 8/2024 | Shete | ................. H04W 24/02 |

FOREIGN PATENT DOCUMENTS

| | | | | |
|---|---|---|---|---|
| JP | 5789745 | | 10/2015 | |
| KR | 10-2020-0091308 | | 7/2020 | |
| KR | 10-2020-0111099 | | 9/2020 | |
| WO | WO-2005112306 A1 * | | 11/2005 | ........ H04W 36/0066 |
| WO | WO-2021101355 A1 * | | 5/2021 | ............ H04W 72/20 |

OTHER PUBLICATIONS

Extended European Search Report dated Nov. 25, 2022 issued by the European Patent Office for European Patent Application No. 20890192.6.

Thoralf Czichy, "5G RAN optimization using the O-RAN software community's RIC (RAN Intelligent Controller)", Sep. 23, 2019, 23 pages.

European Office Action (Communication pursuant to Article 94(3) EPC) dated Mar. 24, 2025 issued in European Patent Application No. 20890192.6, 5 pp.

Korean Office Action dated Sep. 19, 2025 issued in Korean Patent Application No. 10-2019-0151746 and English translation, 11 pp.

* cited by examiner

APPARATUS AND METHOD FOR SUPPORTING OPERATOR-SPECIFIC SERVICE IN WIRELESS ACCESS NETWORK

CROSS-REFERENCE TO RELATED APPLICATIONS

This application is a continuation of International Application No. PCT/KR2020/016621 designating the United States, filed on Nov. 23, 2020, in the Korean Intellectual Property Receiving Office and claiming priority to Korean Patent Application No. 10-2019-0151746, filed on Nov. 22, 2019, in the Korean Intellectual Property Office, the disclosures of which are incorporated by reference herein in their entireties.

BACKGROUND

Field

The disclosure relates to a radio access network, and for example, to a device and method for supporting an operator-specific service in a radio access network included in a wireless communication system.

Description of Related Art

Efforts are being made to develop an improved $5^{th}$-generation (5G) communication system or a pre-5G communication system in order to meet the increasing demand for wireless data traffic after commercialization of a $4^{th}$-generation (4G) communication system. For this reason, the 5G communication system or the pre-5G communication system is called a beyond 4G network communication system or a post long term evolution (post LTE) system.

In order to achieve a high data rate, the 5G communication system is being considered for implementation in a ultra high frequency (mmWave) band (e.g., such as a 60 giga (60 GHz) band). In order to alleviate a path loss of radio waves and increase a propagation distance of radio waves in the ultra high frequency band, the 5G communication system is discussing beamforming, massive MIMO, full dimensional MIMO (FD-MIMO), an array antenna, analog beam-forming, and large scale antenna technologies.

Also, to improve a system network, a technology development such as an evolved small cell, an advanced small cell, a cloud radio access network (cloud RAN), an ultra-dense network (ultra-dense network), device to device communication (D2D), wireless backhaul, a moving network, cooperative communication, coordinated multi-points (CoMP), reception interference cancellation, etc., is being made in the 5G communication system.

In addition, in the 5G system, hybrid frequency shift keying and quadrature amplitude modulation (FQAM) and sliding window superposition coding (SWSC), which are advanced coding modulation (ACM) schemes, and filter bank multi carrier (FBMC), non orthogonal multiple access (NOMA), sparse code multiple access (SCMA), etc., which are advanced access technologies, are being developed.

To meet the demand for wireless data traffic, the 5G system and new radio or next radio (NR) have been commercialized, so a service of a high data rate is being provided to a user through the 5G system like 4G, and also it is expected that a wireless communication service having various purposes such as Internet of things (IoT), a service requiring a high reliability for a special purpose, etc. can be provided. Presently, an open radio access network (O-RAN) established by gathered operators and equipment providers in a system mixed with the 4G communication system, the 5G system, etc. defines a new network element (NE) and interface standard, based on the existing 3GPP standard, and is proposing an O-RAN structure.

SUMMARY

Embodiments of the disclosure provide an apparatus and method for supporting an operator-specific service in a radio access network (RAN).

Embodiments of the disclosure provide an apparatus and method for providing and interpreting a message related to a service model (SM) in a radio access network.

According to various example embodiments of the present disclosure, a method for operating an apparatus which uses an interface between a radio access network intelligent controller (RIC) and a node including a base station in a radio access network may include: generating first information related with an RIC service, generating second information indicating the type of a message to be used for transmitting the first information, and transmitting the message including the first information and the second information.

According to various example embodiments of the present disclosure, a method for operating an apparatus which uses an interface between a radio access network intelligent controller (RIC) and a node including a base station in a radio access network may include: receiving a message including first information related to an RIC service, identifying the type of the message, based on second information indicating the type of the message included in the message, and acquiring the first information, based on the second information.

According to various example embodiments of the present disclosure, an apparatus which uses an interface between a radio access network intelligent controller (RIC) and a node including a base station in a radio access network may include: a transceiver, and at least one processor connected to the transceiver. The at least one processor may be configured to control the apparatus to: generate first information related to an RIC service, generate second information indicating the type of a message to be used for forwarding the first information, and transmit the message including the first information and the second information.

According to various example embodiments of the present disclosure, an apparatus which uses an interface between a radio access network intelligent controller (RIC) and a node including a base station in a radio access network may include: a transceiver, and at least one processor connected to the transceiver. The at least one processor may be configured to control the apparatus to: receive a message including first information related to an RIC service, identify the type of the message, based on second information indicating the type of the message included in the message, and acquire the first information, based on the second information.

An apparatus and method of various example embodiments of the present disclosure may support an operator-specific defined radio access network intelligent controller (RIC) service model.

Effects obtainable in the present disclosure are not limited to the above-mentioned effects, and other effects not mentioned would be able to be clearly understood by those having ordinary skill in the art to which the present disclosure belongs from the follow description.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
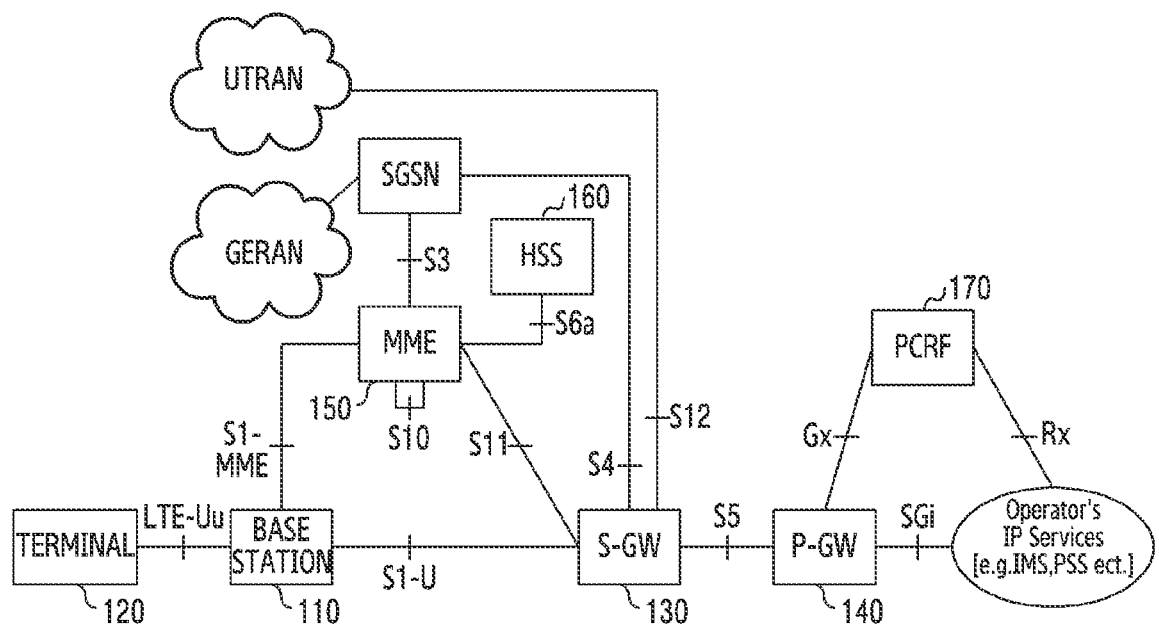
FIG. 1 is a diagram illustrating an example of a 4$^{th}$ generation (4G) long term evolution (LTE) core system.

Terms used in the present disclosure are provided to explain various example embodiments, and are not intended to limit the scope of the various example embodiments. The expression of a singular form may include the expression of a plural form unless otherwise dictating clearly in context. The terms used herein including the technological or scientific terms may have the same meanings as those generally understood by a person having ordinary skill in the art mentioned in the present disclosure. Of the terms used in the present disclosure, terms defined in a general dictionary may be interpreted as the same or similar meanings as the contextual meanings of a related technology, and are not interpreted as ideal or excessively formal meanings unless defined clearly in the present disclosure. According to cases, the terms defined in the present disclosure may not be construed as excluding embodiments of the present disclosure.

In various embodiments of the present disclosure described below, a hardware access method is explained as an example. However, various embodiments of the present disclosure include a technology which uses hardware and software, so various embodiments of the present disclosure do not exclude a software-based access method.

Hereinafter, the present disclosure describes a technology for presenting a proprietary service of an operator through an E2 interface (I/F) at performing operations such as subscription, indication, control, etc. between an apparatus within a radio access network (hereinafter, 'RAN') of a wireless communication system and an apparatus controlling the RAN.

In the following description, the term denoting a signal, the term denoting a channel, the term denoting control information, the term denoting network entities, the term denoting a component of an apparatus, etc are illustrated by way of non-limiting example for description convenience's sake. Accordingly, the present disclosure is not limited to the terms described later, and other terms having equivalent technological meanings may be used.

Also, the present disclosure describes various embodiments using the terms used in some communication standards (e.g., 3rd generation partnership project (3GPP)), but these are just examples for explanation. Various embodiments of the present disclosure may be easily modified and applied even in other communication systems.

As a 4$^{th}$ generation (4G)/5$^{th}$ generation (5G) communication system (e.g., new radio (NR)) is commercialized, a service support differentiated for a user has been required in a virtualized network. So, an open radio access network (O-RAN) has newly defined a radio unit (RU), a digital unit (DU), a central unit (CU)—control plane (CP), and a CU—user plane (UP), which are nodes of a 3GPP network entity (NE) and a base station, as an O(O-RAN)-RU, an O-DU, an O-CU-CP, and an O-CU-UP, respectively, and besides this, has additionally standardized a near-real-time (NRT) radio access network intelligent controller (RIC). The present disclosure is to support an operator-specific service model in an E2 interface through which an RIC requests a service to the O-DU, the O-CU-CP or the O-CU-UP. Here, the O-RU, the O-DU, the O-CU-CP, and the O-CU-UP may be understood as entities of an RAN capable of operating according to the O-RAN standard, and may be called an E2 node. An interface with the entities of the RAN capable of operating according to the O-RAN standard between the RIC and the E2 nodes uses an E2 application protocol (E2AP).

The RIC is a logical node capable of collecting information to a cell site where the O-DU, the O-CU-CP or the O-CU-UP transceives with a terminal.

The RIC may be implemented in a form of a server which is arranged intensively in one physical place. Connection may be made through Ethernet between the O-DU and the RIC, between the O-CU-CP and the RIC, and/or between the O-CU-UP and the RIC. For this, an interface standard for communication between the O-DU and the RIC, between the O-CU-CP and the RIC, and/or between the O-CU-UP and the RIC was needed, and a message standard such as an E2-DU, an E2-CU-CP, an E2-CU-UP, etc. and the definition of a procedure between the O-DU, the O-CU-CP or the O-CU-UP and the RIC is required. For example, a service support differentiated for a user is required in a virtualized network, and there is a need for the definition of a function of a message of the E2-DU, the E2-CU-CP, and/or the E2-CU-UP for supporting a service for widespread cell coverage by concentrating a call processing message/function provided by the O-RAN on the RIC.

For example, the RIC may perform communication for the O-DU, the O-CU-CP, and the O-CU-UP using the E2 interface, and set up an event provision condition by providing and transmitting a subscription message. The transmission may be performed through an E2 indication/report. Control over the O-DU, the O-CU-CP, and the O-CU-UP is presented using an E2 control message.

FIG. 1 is a diagram illustrating an example of a 4$^{th}$ generation (4G) long term evolution (LTE) core system.

Referring to FIG. 1, the LTE core system includes a base station 110, a terminal 120, a serving gateway (S-GW) 130, a packet data network gateway (P-GW) 140, a mobility management entity (MME) 150, a home subscriber server (HSS) 160, and a policy and charging rule function (PCRF) 170.

The base station 110 is a network infrastructure presenting a radio access to the terminal 120. For example, the base station 110 is an apparatus which collects state information such as a buffer state of the terminal 110, available transmit power, a channel state, etc. and performs scheduling. The base station 110 has coverage which is defined as a predetermined geographical area, based on a distance capable of transmitting a signal. The base station 110 is connected with the MME 150 through an S1-MME interface. The base station 110 may be denoted as, besides the base station, an 'access point (AP)', an 'eNodeB (eNB)', a 'wireless point', a 'transmission/reception point (TRP)' or other terms having technological meanings equivalent to these.

The terminal 120 is an apparatus used by a user, and performs communication with the base station 110 through a wireless channel.

According to cases, the terminal 120 may be operated without user's participation. That is, at least one of the terminal 120 and the terminal 130 is an apparatus performing machine type communication (MTC), and may not be carried by the user. The terminal 120 may be denoted as, besides the terminal, a 'user equipment (UE)', a 'mobile station', a 'subscriber station', a 'remote terminal', a 'wireless terminal', or a 'user device' or other terms having technological meanings equivalent to these.

The S-GW 130 presents a data bearer, and provides or controls the data bearer in accordance with the control of the MME 150. For example, the S-GW 130 processes a packet having been arrived from the base station 110 or a packet to be forwarded to the base station 110. Also, the S-GW 130 may perform an anchoring role at handover between base stations of the terminal 120. The P-GW 140 may function as a connection point with an external network (example: the Internet network). Also, the P-GW 140 allocates the terminal 120 an Internet protocol (IP) address, and performs an anchoring role for the S-GW 130. Also, the P-GW 140 may apply a quality of service (QoS) policy of the terminal 120, and manage account data.

The MME 150 manages the mobility of the terminal 120. Also, the MME 150 may perform authentication on the terminal 120, bearer management, etc. That is, the MME 150 takes charge of mobility management for a terminal and various kinds of control functions. The MME 150 may interwork with a serving GPRS support node (SGSN).

The HSS 160 stores key information for authentication of the terminal 120, and a subscriber profile. The key information and the subscriber profile are forwarded from the HSS 160 to the MME 150 when the terminal 120 accesses a network.

The PCRF 170 defines a policy, and a rule for charging. The stored information is forwarded from the PCRF 180 to the P-GW 140, and the P-GW 140 may perform control (example: QoS management, charging, etc.) for the terminal 120, based on the information presented from the PCRF 180.

A carrier aggregation (CA) technology is a technology in which a plurality of component carriers are combined, and one terminal transceives a signal by concurrently using the plurality of component carriers, thereby increasing a frequency use efficiency in aspects of terminal or base station. In detail, according to the CA technology, the terminal and the base station may transceive a broadband signal using the plurality of component carriers in each of uplink (UL) and downlink (DL), and in this case, each component carrier is located in a mutually different frequency band. Below, uplink may refer, for example, to a communication link in which the terminal transmits a signal to the base station, and downlink may refer, for example, to a communication link in which the base station transmits a signal to the terminal. In this case, the numbers of uplink component carriers and downlink component carriers may be different from each other.

A dual connectivity or multi connectivity technology is a technology in which one terminal is connected to a plurality of mutually different base stations and transceives a signal by concurrently using carriers within the plurality of respective base stations, located in mutually different frequency bands, thereby increasing the frequency use efficiency in aspects of terminal or base station. The terminal may be simultaneously connected to a first base station (example: a base station presenting a service using an LTE technology or a 4G mobile communication technology) and a second base station (example: a base station presenting a service using a new radio (NR) technology or a 5$^{th}$ generation (5G) mobile communication technology), and transceive traffic. In this case, a frequency resource used by each base station may be located in a mutually different band. A scheme of operating based on an LTE and NR dual connectivity scheme as above may be called 5G non-standard alone (NSA).

Figure 2A:
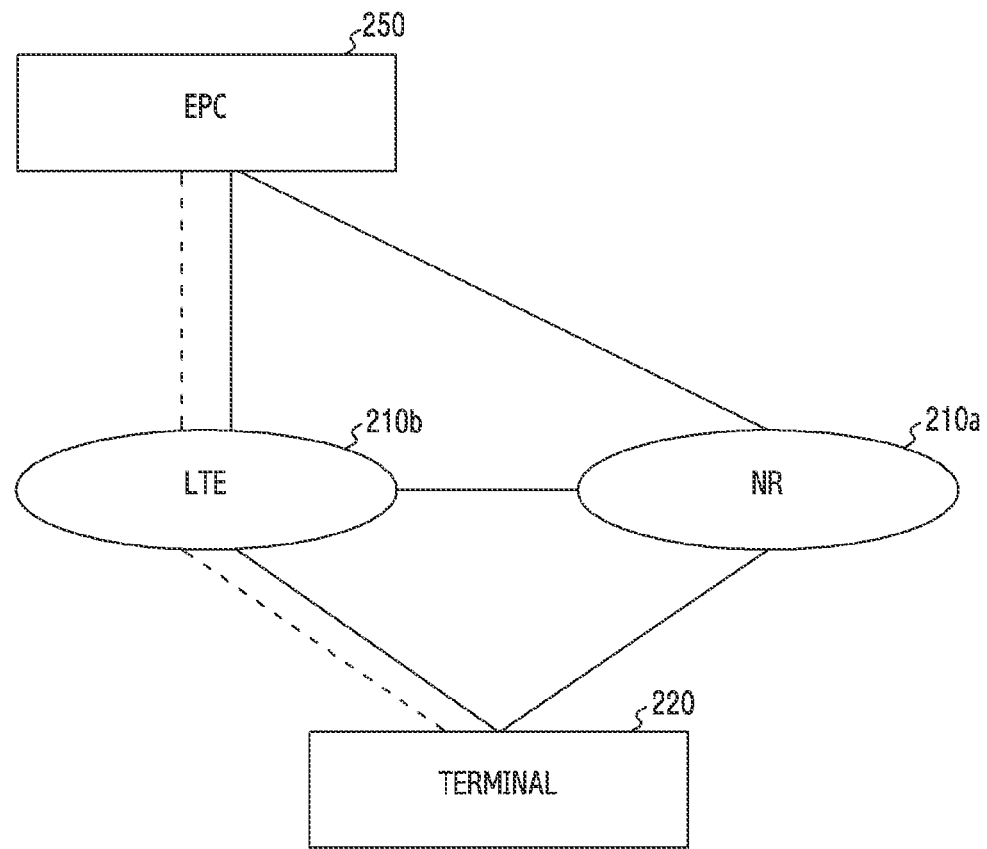
FIG. 2A is a diagram illustrating an example of a 5$^{th}$ generation (5G) non-stand alone (NSA) system.

FIG. 2A is a diagram illustrating an example of a 5G NSA system. Referring to FIG. 2A, the 5G NSA system includes an NR RAN 210a, an LTE RAN 210b, a terminal 220, and an evolved packet core (EPC) 250. The NR RAN 210a and the LTE RAN 210b may be connected to the EPC 150, and the terminal 220 may receive a service concurrently from any one of the NR RAN 210a and the LTE RAN 210b or the both. The NR RAN 210a includes at least one NR base station, and the LTE RAN 210b includes at least one LTE base station. Here, the NR base station may be denoted as a '5$^{th}$ generation (5G) node', a 'next generation nodeB (gNB)' or other terms having a technological meaning equivalent to these. Also, the NR base station may have a structure separated into a central unit (CU) and a digital unit (DU), and also the CU may have a structure separated into a CU—control plane (CP) unit and a CU—user plane (UP) unit.

In a structure of FIG. 2A, the terminal 220 may perform radio resource control (RRC) access through a first base station (example: a base station belonging to the LTE RAN 210b), and receive a service of a function (example: connection management, mobility management, etc.) presented by a control plane. Also, the terminal 220 may receive an additional wireless resource for transceiving data through a second base station (example: a base station belonging to the NR RAN 210a). A dual connectivity technology using these LTE and NR may be denoted as evolved universal terrestrial radio access (E-UTRA)—NR dual connectivity (EN-DC). Similarly, a dual connectivity technology in which the first base station uses an NR technology and the second base station uses an LTE technology is denoted as NR-E-UTRA dual connectivity (NE-DC). Also, various embodiments may be applied to multiple connectivity and carrier aggregation technologies of various forms besides this. Also, various embodiments may be applied even to when a first system using a first communication technology and a second system using a second communication technology are implemented in one apparatus or when the first base station and the second base station are located in the same geographical position.

Figure 2B:
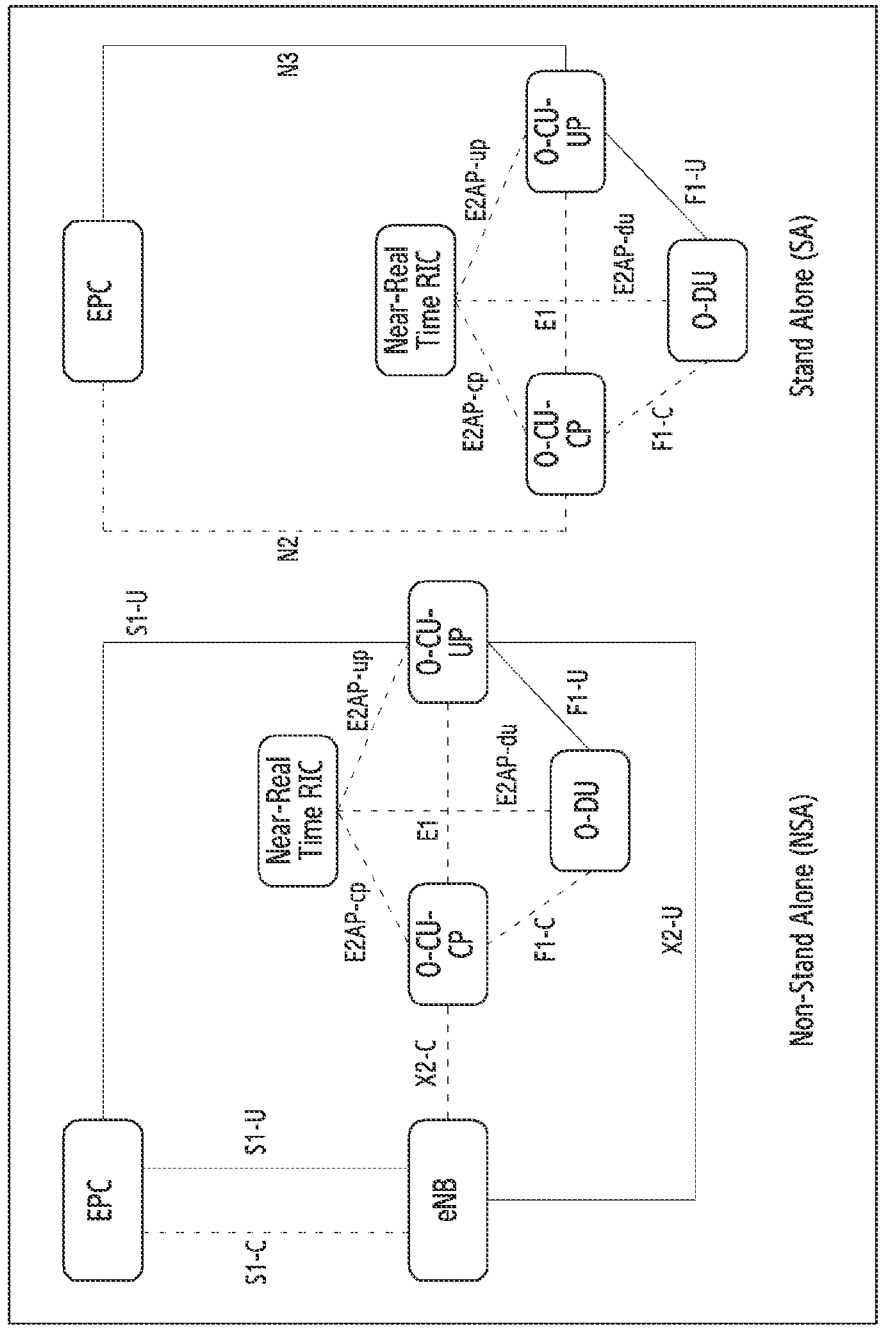
FIG. 2B is a diagram illustrating an example of an architecture for an O-RAN.

FIG. 2B is a diagram illustrating an example of an architecture for an O-RAN. It may be assumed that, for the purpose of key performance indicator (KPI) monitoring (E2-SM-KPIMON) of an E2 service model, an O-RAN non-stand alone mode in a multi-connectivity operation using an E-UTRA and NR radio access technology is considered, while an E2 node is in an O-RAN stand alone mode.

Referring to FIG. 2B, in the deployment of the O-RAN non-stand alone mode, an eNB may be connected to an EPC through an S1-C/S1-U interface, and may be connected to an O-CU-CP through an X2 interface. In the deployment of the O-RAN stand alone mode, an O-CU-CP may be connected to a 5G core (5GC) through an N2/N3 interface.

Figure 3:
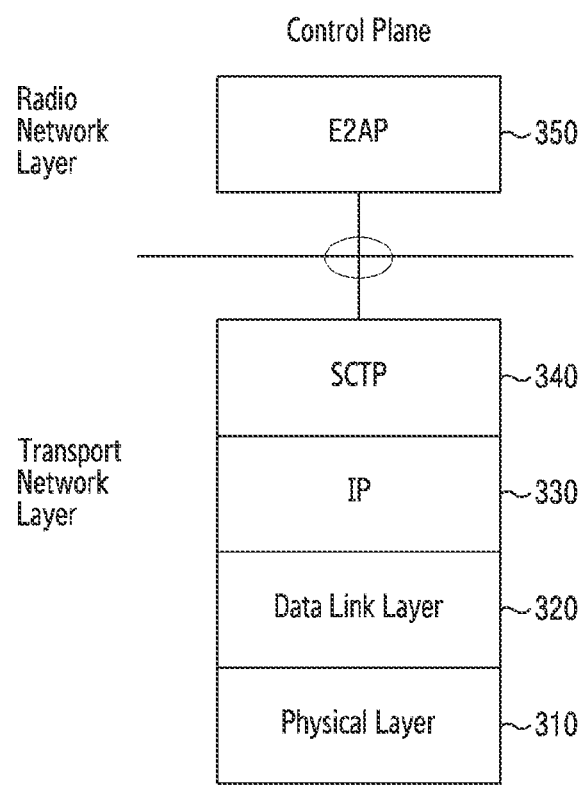
FIG. 3 is a diagram illustrating a protocol stack of an E2 application protocol message in a radio access network according to various embodiments.

FIG. 3 is a diagram illustrating an example protocol stack of an E2 application protocol message in a radio access network according to various embodiments. Referring to FIG. 3, a control plane includes a transport network layer and a radio network layer. The transport network layer includes a physical layer 310, a data link layer 320, an Internet protocol (IP) 330, and a stream control transmission protocol (SCTP) 340.

The radio network layer includes an E2AP 350. The E2AP 350 is used to forward a subscription message, an indication message, a control message, a service update message, a service query message, and is transmitted over the SCTP 340 and the IP 330.

Figure 4:
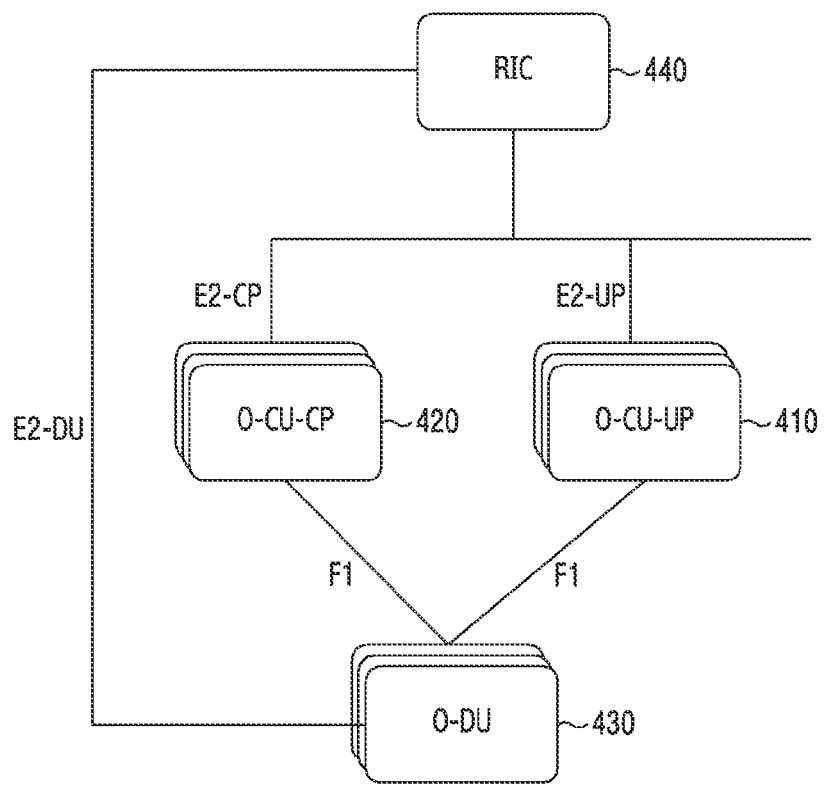
FIG. 4 is a diagram illustrating an example of connection between a base station and a radio access network intelligence controller (RIC) in a radio access network according to various embodiments.

FIG. 4 is a diagram illustrating an example of connection between a base station and a radio access network intelligence controller (RIC) in a radio access network according to various embodiments.

Referring to FIG. 4, the RIC 440 is connected with an O-CU-CP 420, an O-CU-UP 410, and an O-DU 430. The RIC 440 is a apparatus for customizing an RAN functionality for new service or regional resource optimization. The RIC 440 may present a function of network intelligence (example: policy enforcement and handover optimization), resource assurance (example: radio-link management and advanced self-organized-network (SON)), resource control (example: load balancing and slicing policy), etc. The RIC 440 may perform communication with the O-CU-CP 420, the O-CU-UP 410, and the O-DU 430. The RIC 440 is possible to connect with each node by an E2-CP, E2-UP, or E2-DU interface. Also, an interface between the O-CU-CP and the DU and/or between the O-CU-UP and the DU may be called an F1 interface. In the following description, the DU and the O-DU, the CU-CP and the O-CU-CP, or the CU-UP and the O-CU-UP may be used interchangeably.

In FIG. 4, an embodiment of one RIC 440 is illustrated, but in accordance with various embodiments, a plurality of RICs may exist. The plurality of RICs may be implemented in a plurality of hardware located in the same physical position or be implemented through virtualization using one hardware.

Figure 5:
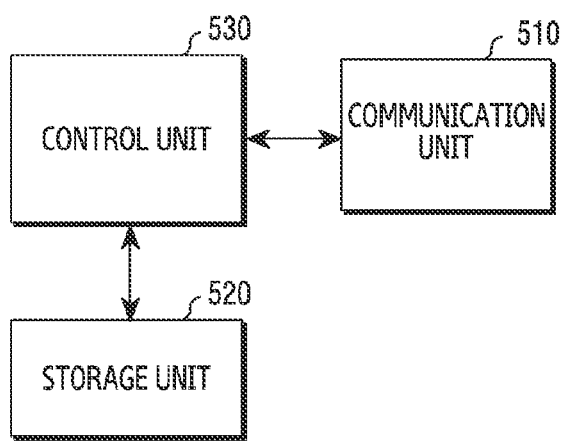
FIG. 5 is a block diagram illustrating an example configuration of an network entity in a radio access network according to various embodiments.

FIG. 5 is a block diagram illustrating an example configuration of an network entity according to various embodiments. An embodiment of structure illustrated in FIG. 5 may be understood as a construction of an network entity having a function of at least one of the RIC, the O-CU-CP, the O-CU-UP, and the O-DU of FIG. 5. The terms ' . . . unit', ' . . . er', etc. used below may refer, for example, the unit of processing at least one function or operation and may include various circuitry and/or software. This may be implemented in hardware or software, or a combination of hardware and software. Further, a network entity may referred to as a device and/or an apparatus.

Referring to FIG. 5, a core network entity includes a communication unit (e.g., including communication circuitry) 510, a storage unit (e.g., including a memory) 520, and a control unit (e.g., including processing circuitry) 530.

The communication unit 510 may include various communication circuitry and presents an interface for performing communication with other entities within a network. For example, the communication unit 510 converts a bit string transmitted from the core network entity to other entities into a physical signal, and converts a physical signal received from other entities into a bit string. For example, the communication unit 510 may transmit and receive a signal. Accordingly to this, the communication unit 510 may be called a modem, a transmitter, a receiver, or a transceiver. At this time, the communication unit 510 may enable the core network entity to communicate with other entities or a system via backhaul connection (example: wired backhaul or wireless backhaul) or via a network.

The storage unit 520 may include a memory and stores data such as a basic program for an operation of the core network entity, an application program, setup information, etc. The storage unit 520 may be comprised of a volatile memory, a non-volatile memory, or a combination of the volatile memory and the non-volatile memory. And, the storage unit 520 presents the stored data in accordance with a request of the control unit 530.

The control unit 530 may include various processing circuitry and controls general operations of the core network entity. For example, the control unit 530 transceives a signal through the communication unit 510. Also, the control unit 530 records data in the storage unit 520, and reads. For this, the control unit 530 may include at least one processor. In accordance with various embodiments, the control unit 530 may control the network entity to perform operations of various embodiments described in the present disclosure.

Figure 6:
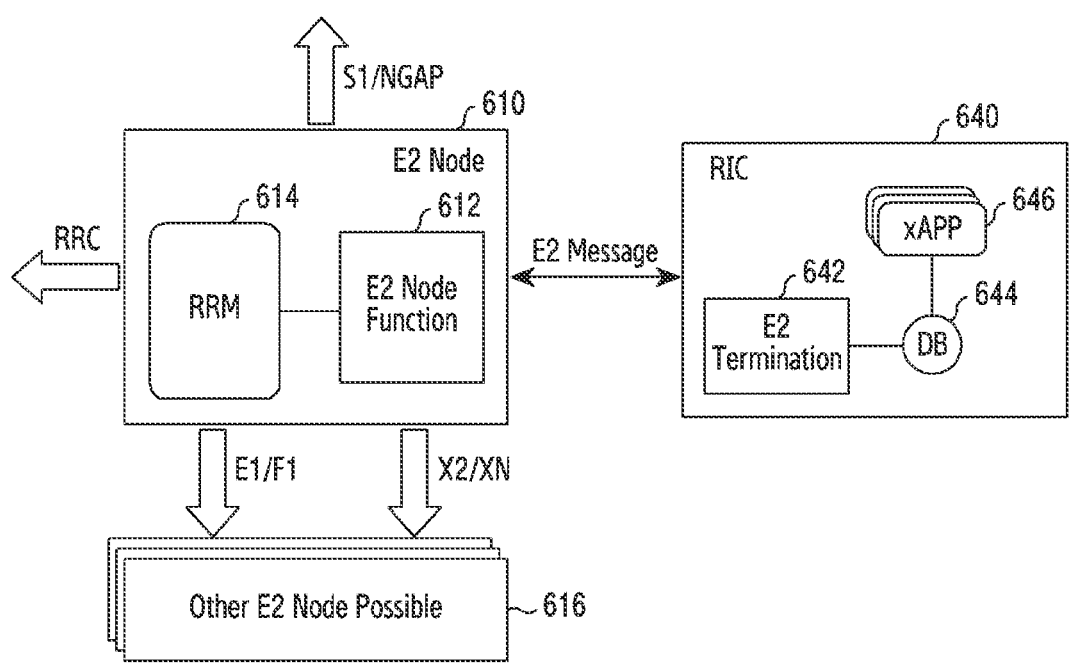
FIG. 6 is a diagram illustrating a logical function related to an E2 message of an E2 node and an RIC in a radio access network according to various embodiments.

FIG. 6 is a diagram illustrating a logical function related to an E2 message of an E2 node and an RIC in a radio access network according to various embodiments.

Referring to FIG. 6, the RIC 640 and the E2 node 610 may transmit or receive an E2 message therebetween. In an embodiment, the E2 node 610 may be an O-CU-CP, an O-CU-UP, an O-DU, or a base station. A communication interface of the E2 node may be determined according to the type of the E2 node 610. In an embodiment, the E2 node 610 may perform communication with another E2 node 616 through an E1 interface or an F1 interface. Or, in an embodiment, the E2 node 610 may perform communication with the E2 node 616 through an X2 interface or an XN interface. Or, in an embodiment, the E2 node 610 may perform communication through an S1 interface or a next generation application protocol (NGAP) interface (e.g., an interface between a next generation (NG) RAN node and an AMF).

The E2 node 610 includes an E2 node function 612. The E2 node function 612 is a function corresponding to a specific application S/W (xApp) 646 installed in the RIC 640. In an embodiment, in case of a KPI monitor, a KPI monitor collection S/W may be installed in the RIC 640, and the E2 node 610 may include an E2 node function 612 of providing KPI parameters and then forwarding an E2 message including the KPI parameter to an E2 termination function 642 located in the RIC 640. The E2 node 610 may manage resources presented to a wireless network for a terminal.

The E2 termination function 642 located in the RIC 640 is a termination of the RIC 640 for the E2 message, and performs a function of interpreting the E2 message forwarded by the E2 node 610 and then forwarding to the xApp 646. A database (DB) 644 located in the RIC 640 may be used for the E2 termination 624 or the xApp 616. The E2 node 610 illustrated in FIG. 6 is a termination of at least one interface, and may be understood as a termination of messages forwarded to a terminal, a peripheral base station, and/or a core network.

Figure 7:
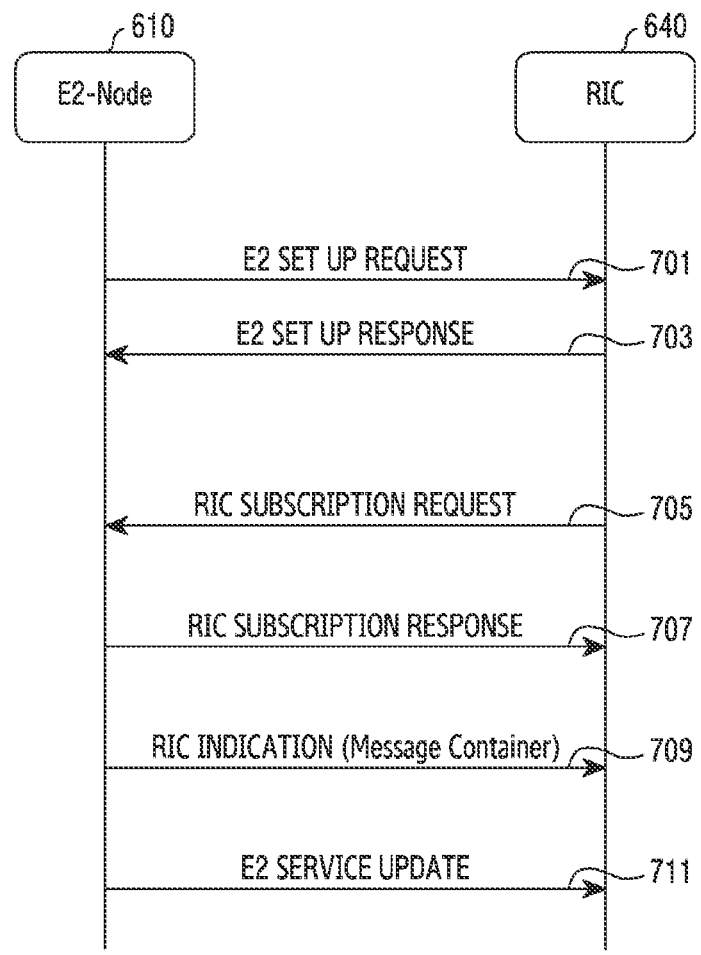
FIG. 7 is a signal flow diagram illustrating an example procedure for setup of E2 I/F between an E2 node and an RIC, RIC subscription, and information presentation in a radio access network according to various embodiments.

FIG. 7 is a signal flow diagram illustrating an example procedure for setup of E2 I/F between an E2 node and an RIC, RIC subscription, and information presentation in a radio access network according to various embodiments.

Referring to FIG. 7, in operation 701, the E2 node 610 transmits an E2 setup request message to the RIC 640. For example, an E2 node function located in the E2 node 610 searches for the RIC 640 using an IP address of the RIC 640 set up by operation-administration-maintenance (OAM) and transmits the E2 setup request message. The E2 setup request message may include an RAN function capability information element (IE) (e.g., RAN FUNCTION DEFINITION) supported by the E2 node 610, an E2 node ID, and the like. A value of the RAN FUNCTION DEFINITION is a value set up by OAM and may include an RIC STYLE ID value. The RIC 640 may receive the RAN FUNCTION DEFINITION value through the E2 setup message or an E2 service update message, and may identify which call processing function is supported by the E2 node 610, based on the RAN FUNCTION DEFINITION value. In operation 703, the RIC 640 transmits an E2 SETUP RESPONSE message to the E2 node 610. For example, when the E2 setup request message transmitted by the E2 node 610 is acceptable, the RIC 640 transmits the E2 setup response message.

In operation 705, the RIC 640 transmits an RIC SUBSCRIPTION REQUEST message to the E2 node 610. For example, a specific xApp located in the RIC 640 requests an RIC E2 termination function to subscribe to a specific E2 RAN FUNCTION DEFINITION function supported by E2. Here, the E2 RAN FUNCTION DEFINITION may be a service model (SM) defined specifically for an operator, and whether an operator is specific may be indicated using an RIC STYLE ID. Whether the operator is specified may be indicated by an IE other than the RIC STYLE ID. According to an embodiment, the RIC subscription request message may be included in the E2 setup response message transmitted in operation 703.

In operation 707, the E2 node 610 transmits an RIC SUBSCRIPTION RESPONSE message to the RIC 640. For example, the E2 node function of the E2 node 610 decodes the RIC subscription request message and configures an event condition that the RIC 640 has requested to the E2 node function. The event condition may be a service model specifically defined by the operator as RAN FUNCTION DEFINITION, and whether the operator is specific may be specified by the RIC STYLE ID. After successfully configuring the event condition, the E2 node 610 may notify the RIC 640 that an event trigger condition is successfully configured, by transmitting the RIC subscription response message.

In operation 709, the E2 node 610 transmits an RIC INDICATION to the RIC 640. In an embodiment, when a specific event condition is satisfied, the E2 node 610 transmits an E2 RIC indication message to the RIC 640. The RIC indication may be a message container. The RIC indication message may be a service model specifically defined by the operator, and whether the user is specific may be specified by the RIC STYLE ID.

In operation 711, the E2 node 610 transmits an E2 service update message to the RIC 640. In an embodiment, as an IE value of the RAN FUNCTION DEFINITION is changed, the E2 node 610 transmits the changed RAN FUNCTION DEFINITION using the E2 service update message.

Figure 8:
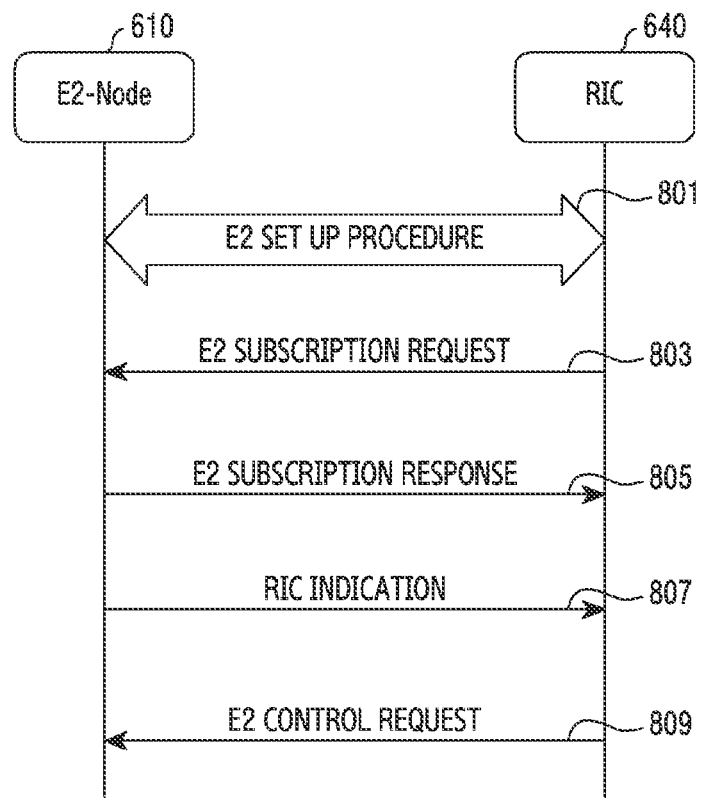
FIG. 8 is a signal flow diagram illustrating an example procedure for E2 RIC control between an E2 node and an RIC in a radio access network according to various embodiments.

FIG. 8 is a signal flow diagram illustrating an example procedure for E2 RIC control between an E2 node and an RIC in a radio access network according to various embodiments.

Referring to FIG. 8, in operation 801, the E2 node 610 and the RIC 640 perform an E2 setup procedure. An E2 node function located in the E2 node 610 may find the RIC 640 using an IP address of the RIC 640 set up by OAM, and then transmit an E2 setup request message, thereby notifying which call processing function is supported by the E2 node 610. In response to this, the RIC 640 may transmit an E2 setup response message to the E2 node 610.

In operation 803, the RIC 640 transmits an RIC SUBSCRIPTION REQUEST message to the E2 node 610. In other words, a specific xApp located in the RIC 640 requests an RIC E2 termination function to subscribe to a specific E2 RAN FUNCTION DEFINITION function supported by E2. The E2 RAN FUNCTION DEFINITION may be a service model (SM) defined specifically for an operator, and whether the operator is specific may be indicated using an RIC STYLE ID. Whether the operator is specified may be indicated by an IE other than the RIC STYLE ID. According to an embodiment, the RIC subscription request message may be included in the E2 setup response message transmitted in operation 703. When the E2 node 640 supports the operator-specifically defined service model, an operator-specific subscription may be configured using an RIC event trigger definition.

In operation 805, the E2 node 610 transmits an E2 subscription response message to the RIC 640. For example, the E2 node 610 may notify a success or non-success of the operator-specific subscription to the RIC 640 by transmitting the subscription response message.

In operation 807, the E2 node 610 transmits an RIC INDICATION to the RIC 640. In an embodiment, when an event satisfying an operator-specific event trigger condition configured by the subscription request message occurs, the E2 node function of the E2 node 610 forwards an E2 RIC indication message to the RIC 640. The RIC indication may be a message container. In this case, the E2 indication message may be transmitted in an operator-specific message type. According to an embodiment, whether the operator-specific message is may be indicated by an RIC INDICATION HEADER TYPE, an RIC INDICATION MESSAGE TYPE, or an RIC STYLE ID.

In operation 809, the RIC 640 transmits an E2 CONTROL REQUEST message to the E2 node 610. The RIC 640 may control the event occurring in operation 807, by transmitting the E2 control request message to the E2 node function. In this case, the E2 control message may be transmitted in an operator-specific message type. According to an embodiment, whether the operator-specific message is may be indicated by an RIC CONTROL HEADER TYPE, an RIC CONTROL MESSAGE TYPE, or an RIC STYLE ID.

Figure 9:
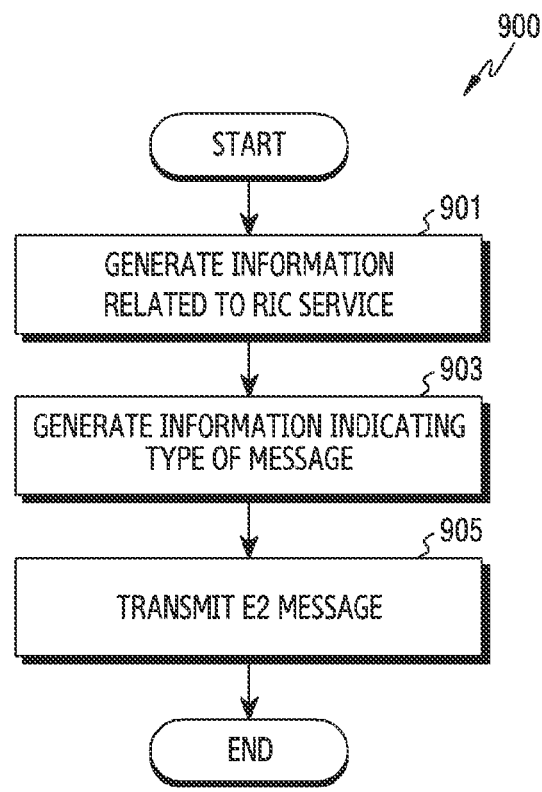
FIG. 9 is a flowchart illustrating an example operation of providing and transmitting an E2 message in a radio access network according to various embodiments.

FIG. 9 is a flowchart 900 illustrating an example operation of providing and transmitting an E2 message in a radio access network according to various embodiments. FIG. 9 illustrates an operation method of an E2 node or an RIC. Since the E2 message may be transmitted by the E2 node or the RIC, an operating subject of the flowchart 900 of FIG. 9 below may be understood as the E2 node or the RIC. For convenience, the operating subject of the flowchart 900 of FIG. 9 is referred to as a 'apparatus'.

Referring to FIG. 9, in operation 901, the apparatus provides or generates information related to an RIC service. The service may be related to an operation for supporting a radio access performed in the E2 node. For example, the service may be related to operations such as call processing, call connection, call acceptance determination, handover, carrier aggregation, dual connectivity, and the like. In this case, according to the related operation, the information related to the RIC service may follow a format defined in the standard or may follow an operator-specific format.

In operation 903, the apparatus provides or generates information indicating a message type. The message type corresponds to the RIC service corresponding to the information provided in operation 901. At this time, a value of the information indicating the message type may belong to a first range when the information related to the RIC service follows the format defined in the standard, and may belong to a second range when the information related to the RIC service does not follow the format defined in the standard. Here, the second range is a range including values allocated for a service specifically defined by an operator.

In operation 905, the apparatus transmits an E2 message. The apparatus provides the E2 message including the information provided in operation 901 and the information provided in operation 903, and transmits the provided E2 message.

Figure 10:
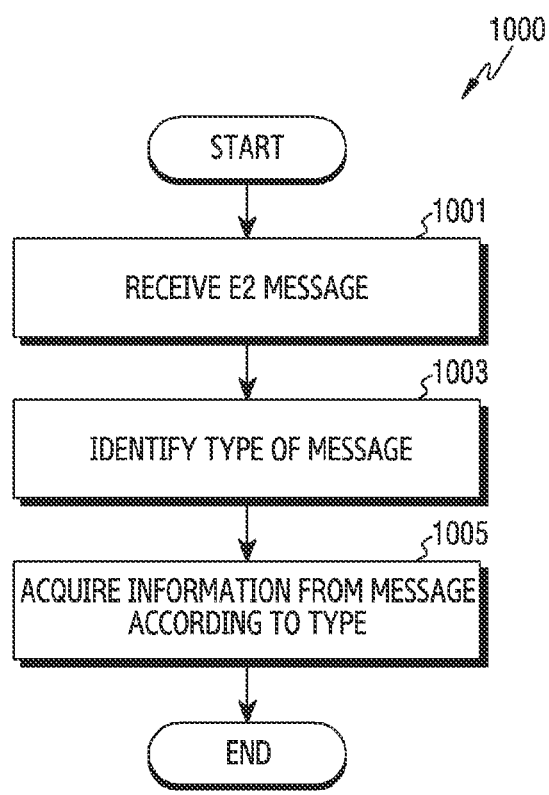
FIG. 10 is a flowchart illustrating an example operation of receiving and interpreting an E2 message in a radio access network according to various embodiments.

FIG. 10 is a flowchart 1000 illustrating an example operation of receiving and interpreting an E2 message in a radio access network according to various embodiments. FIG. 10 illustrates an operation method of an E2 node or an RIC. Since the E2 message may be transmitted by the E2 node or the RIC, an operating subject of the flowchart 1000 of FIG. 10 below may be understood as the E2 node or the RIC. For convenience, the operating subject of the flowchart 1000 of FIG. 10 is referred to as an 'apparatus'.

Referring to FIG. 10, in operation 1001, the apparatus receives an E2 message. The E2 message may include information related to an RIC service and information indicating the type of the message.

In operation 1003, the apparatus identify the type of the message. For example, the message includes information indicating the type. The information indicating the type may be included in a fixed position regardless of whether a format of the message has been defined as operator-specific. For example, when a value of the information indicating the message type belongs to a first range, the apparatus may confirm that the received E2 message follows one of the formats defined in the standard. For another example, when the value of the information indicating the message type belongs to a second range, the apparatus may confirm that the received E2 message does not follow one of the formats defined in the standard, but follows the format defined specifically by the operator. The second range is a range including values allocated for an operator-specifically defined service.

In operation 1005, the apparatus acquires information from the message according to the type. When the value of the information indicating the message type belongs to the first range, the apparatus may analyze the received E2 message, based on one of the formats defined in the standard, and acquire the information related to the RIC service. When the value of the information indicating the message type belongs to the second range, the apparatus may analyze the E2 message, based on the received operator-specifically defined format, and acquire the information related to the RIC service.

As described above, various E2 messages may be used for procedures performed between the E2 node and the RIC. In this case, not a service model defined in the standard, but a service model specifically defined for an operator may be used. When a service model defined specifically for the operator is used, a message related to the corresponding service model follows a structure or format defined by the corresponding operator. In this case, information or an indicator for notifying that the structure or format of the message is defined by the operator may be included in the message. For example, various messages including the information or indicator for notifying that the structure or format of the message is defined by the operator may be defined as shown in [Table 1] to [Table 9] below.

TABLE 1

| IE/Group Name-> | Presence | Range | IE type and reference | Semantics description |
| --- | --- | --- | --- | --- |
| RIC EVENT TRIGGER DEFINITION TYPE | M | 1 . . . <maxofType> | x.x.x | Type number 129~256 is reserved for the operator-specific use. |
| RIC Style ID | M | | 8.3.3 | |
| E2SM-xxx-IE2 | M | | 8.3.12 | |
| E2SM-xxx-IE3 | M | | 8.3.13 | |
| RIC Parameter Type | M | | 8.3.5 | |
| Sequence of E2SM-xxx-IE4 | | 0 . . . <maxofIE> | | |
| >RIC Parameter ID | M | | 8.3.6 | |
| >RIC Parameter Test Condition | O | | 8.3.7 | |
| >RIC Parameter Value | O | | 8.3.8 | |

Table 1 is an example of an RIC EVENT TRIGGER DEFINITION IE included in the E2 subscription request message. According to an embodiment, an RIC EVENT TRIGGER DEFINITION TYPE field may be defined, and through this, a maximum of 256 RIC EVENT TRIGGERs may be defined, and values of sections 129 to 256 among the 256 types may be defined by an operator, thereby being used as an out-of-standard method. In an embodiment, when the RIC EVENT TRIGGER DEFINITION TYPE field is defined as one of 129 to 256, the remaining fields included in the RIC EVENT TRIGGER DEFINITION IE may be configured specifically for an operator. In other words, at least one of the remaining fields other than the RIC EVENT TRIGGER DEFINITION TYPE field illustrated in Table 1 may be omitted, and at least one other field may be added. The newly added field may be a field not defined in the standard, and the setup and interpretation of the value may follow the operator-specific rules.

TABLE 2

| IE/Group Name | Presence | Range | IE type and reference | Semantics description |
|---|---|---|---|---|
| RIC ACITION DEFINITION TYPE | M | 0 . . . <maxofType> | | Type number 129~256 is reserved for the operator-specific use. |
| RIC Style ID | M | | 8.3.3 | |
| Sequence of RIC Parameters | | 0 . . . <maxofParameters> | | |
| >RIC Parameter ID | M | | 8.3.6 | |
| >RIC Parameter Value | M | | 8.3.8 | |

Table 2 is an example of an RIC ACTION DEFINITION IE included in the E2 subscription request message. According to an embodiment, an RIC ACTION DEFINITION TYPE field may be defined, and through this, a maximum of 256 RIC ACTION DEFINITIONs may be defined, and values of sections 129 to 256 among the 256 types may be defined by the operator, thereby being used as an out-of-standard method. In an embodiment, when the RIC ACTION DEFINITION TYPE field is defined as one of 129 to 256, the remaining fields included in the RIC ACTION DEFINITION IE may be configured specifically for the operator. In other words, at least one of the remaining fields other than the RIC ACTION DEFINITION TYPE field illustrated in Table 2 may be omitted, and at least one other field may be added. The newly added field may be a field not defined in the standard, and the setup and interpretation of the value may follow the operator-specific rules.

TABLE 3

| IE/Group Name | Presence | Range | IE type and reference | Semantics description |
|---|---|---|---|---|
| RIC INDICATION HEADER TYPE | M | 0 . . . <maxofType> | | Type number 129~256 is reserved for the operator-specific use. |
| RIC Style ID | M | | 8.3.3 | |
| E2SM-xxx-IE2 | M | | 8.3.12 | |
| E2SM-xxx-IE3 | M | | 8.3.13 | |
| E2SM-xxx-IE4 | O | | 8.3.14 | |

Table 3 is an example of an RIC INDICATION HEADER IE included in the E2 indication message. According to an embodiment, an RIC INDICATION HEADER TYPE field may be defined, and through this, a maximum of 256 RIC INDICATION HEADERs may be defined, and values of sections 129 to 256 among 256 types may be defined by the operator, thereby being used as an out-of-standard method. In an embodiment, when the RIC INDICATION HEADER TYPE field is defined as one of 129 to 256, the remaining fields included in the RIC INDICATION HEADER IE may be configured specifically for the operator. In other words, at least one of the remaining fields other than the RIC INDICATION HEADER TYPE field illustrated in Table 3 may be omitted, and at least one other field may be added. The newly added field may be a field not defined in the standard, and the setup and interpretation of the value may follow the operator-specific rules.

TABLE 4

| IE/Group Name | Presence | Range | IE type and reference | Semantics description |
|---|---|---|---|---|
| RIC INDICATION MESSAGE TYPE | M | 0 ... <maxofType> | | Type number 129~256 is reserved for the operator-specific use. |
| RAN Container | M | | 8.3.11 | |

Table 4 is an example of an RIC INDICATION MESSAGE IE included in the E2 indication message. According to an embodiment, an RIC INDICATION MESSAGE TYPE field may be defined, and through this, a maximum of 256 RIC INDICATION MESSAGEs may be defined, and values of sections 129 to 256 among 256 types may be defined by the operator, thereby being used as an out-of-standard method. In an embodiment, when the RIC 10 INDICATION MESSAGE TYPE field is defined as one of 129 to 256, the remaining fields included in the RIC INDICATION MESSAGE IE may be configured specifically for the operator. In other words, at least one of the remaining fields other than the RIC INDICATION MESSAGE TYPE field illustrated in Table 4 may be omitted, and at least one other field may be added. 15 The newly added field may be a field not defined in the standard, and the setup and interpretation of the value may follow the operator-specific rules.

TABLE 5

| IE/Group Name | Presence | Range | IE type and reference | Semantics description |
|---|---|---|---|---|
| RIC CONTROL HEADER TYPE | M | 0 ... <maxofType> | | Type number 129~256 is reserved for the operator-specific use. |
| RIC Style ID | M | | 8.3.3 | |
| E2SM-xxx-IE | M | | 8.3.12 | |

Table 5 is an example of an RIC CONTROL HEADER IE included in the E2 control message. According to an embodiment, an RIC CONTROL HEADER TYPE field may be defined, and through this, a maximum of 256 RIC CONTROL HEADERs may be defined, and values of sections 129 to 256 among the 256 types may be defined by the operator, thereby being used as an out-of-standard method. In an embodiment, when the RIC CONTROL HEADER TYPE field is defined as one of 129 to 256, the remaining fields included in the RIC CONTROL HEADER IE may be configured specifically for the operator. In other words, at least one of the remaining fields other than the RIC CONTROL HEADER TYPE field illustrated in Table 5 may be omitted, and at least one other field may be added. The newly added field may be a field not defined in the standard, and the setup and interpretation of the value may follow the operator-specific rules.

TABLE 6

| IE/Group Name | Presence | Range | IE type and reference | Semantics description |
|---|---|---|---|---|
| RIC CONTROL MESSAGE TYPE | M | 0 ... <maxofType> | | Type number 129~256 is reserved for the operator-specific use. |
| RAN Container | M | | 8.3.11 | |

Table 6 is an example of an RIC CONTROL MESSAGE IE included in the E2 control message. According to an embodiment, an RIC CONTROL MESSAGE TYPE field may be defined, and through this, a maximum of 256 RIC CONTROL MESSAGEs may be defined, and values of sections 129 to 256 among the 256 types may be defined by the operator, thereby being used as an out-of-standard method. In an embodiment, when the RIC CONTROL MESSAGE TYPE field is defined as one of 129 to 256, the remaining fields included in the RIC CONTROL MESSAGE IE may be configured specifically for the operator. In other words, at least one of the remaining fields other than the RIC CONTROL MESSAGE TYPE field illustrated in Table 6 may be omitted, and at least one other field may be added. The newly added field may be a field not defined in the standard, and the setup and interpretation of the value may follow the operator-specific rules.

TABLE 7

| IE/Group Name | Presence | Range | IE type and reference | Semantics description |
|---|---|---|---|---|
| RIC CALL PROCESS ID TYPE | M | 0 ... <maxofType> | | Type number 129~256 is reserved for the operator-specific use. |
| RAN Call process ID type 1 | M | | 8.3.10 | |

Table 7 is an example of an RIC CALL PROCESS ID IE included in the E2 control message. According to an embodiment, an RIC CALL PROCESS ID TYPE field may be defined, and through this, a maximum of 256 RIC CALL PROCESS IDs may be defined, and values of sections 129 to 256 among the 256 types may be defined by the operator, thereby being used as an out-of-standard method. In an embodiment, when the RIC CALL PROCESS ID TYPE field is defined as one of 129 to 256, the remaining fields included in the RIC CALL PROCESS ID IE may be configured specifically for the operator. In other words, at least one of the remaining fields other than the RIC CALL PROCESS ID TYPE field illustrated in Table 7 may be omitted, and at least one other field may be added. The newly added field may be a field not defined in the standard, and the setup and interpretation of the value may follow the operator-specific rules.

TABLE 8

| IE/Group Name | Presence | Range | IE type and reference | Semantics description |
|---|---|---|---|---|
| RAN FUNCTION DEFINITION TYPE | M | 0 ... <maxofType> | | Type number 129~256 is reserved for the operator-specific use. |
| RAN Function Name | M | | 8.3.2 | |
| Sequence of Event trigger styles | | 0 ... <maxofStyle> | | |
| >RIC Style ID | M | | 8.3.3 | |
| >RIC Style Name | M | | 8.3.4 | |
| >Sequence of paramters | | | | |
| >>RIC Parameter ID | M | | | |
| >>RIC Parameter Name | M | | | |
| >>RIC Parameter Type | M | | | |
| Sequence of Report styles | | 0 ... <maxofStyle> | | |
| >RIC Style ID | M | | 8.3.3 | |

TABLE 8-continued

| IE/Group Name | Presence | Range | IE type and reference | Semantics description |
|---|---|---|---|---|
| >RIC Style Name | M | | 8.3.4 | |
| >Sequence of parameters | | 0 . . . <maxofActionParameters> | | |
| >>RIC Parameter ID | M | | 8.3.6 | |
| >>RIC Parameter Name | M | | 8.3.9 | |
| >>RIC Parameter Type | M | | 8.3.5 | |
| Sequence of Insert styles | | 0 . . . <maxofStyle> | | |
| >RIC Style ID | M | | 8.3.3 | |
| >RIC Style Name | M | | 8.3.4 | |
| >Sequence of parameters | | 0 . . . <maxofActionParameters> | | |
| >>RIC Parameter ID | M | | 8.3.6 | |
| >>RIC Parameter Name | M | | 8.3.9 | |
| >>RIC Parameter Type | M | | 8.3.5 | |
| Sequence of Control styles | | 0 . . . <maxofStyle> | | |
| >RIC Style ID | M | | 8.3.3 | |
| >RIC Style Name | M | | 8.3.4 | |
| >Sequence of parameters | | 0 . . . <maxofActionParameters> | | |
| >>RIC Parameter ID | M | | 8.3.6 | |
| >>RIC Parameter Name | M | | 8.3.9 | |
| >>RIC Parameter Type | M | | 8.3.5 | |
| Sequence of Policy styles | | 0 . . . <maxofStyle> | | |
| >RIC Style ID | M | | 8.3.3 | |
| >RIC Style Name | M | | 8.3.4 | |
| >Sequence of parameters | | 0 . . . <maxofActionParameters> | | |
| >>RIC Parameter ID | M | | 8.3.6 | |
| >>RIC Parameter Name | M | | 8.3.9 | |
| >>RIC Parameter Type | M | | 8.3.5 | |

Table 8 is an example of an RAN FUNCTION DEFINITION IE included in the E2 service update message. According to an embodiment, an RAN FUNCTION DEFINITION TYPE field may be defined, and through this, a maximum of 256 RAN FUNCTION DEFINITION TYPEs may be defined, and values of sections 129 to 256 among the 256 types may be defined by the operator, thereby being used as an out-of-standard method. For example, when the RAN FUNCTION DEFINITION TYPE field is defined as one of 129 to 256, the remaining fields included in the RAN FUNCTION DEFINITION IE may be configured specifically for the operator. In other words, at least one of the remaining fields other than the RAN FUNCTION DEFINITION TYPE field illustrated in Table 8 may be omitted, and at least one other field may be added. The newly added field may be a field not defined in the standard, and the setup and interpretation of the value may follow the operator-specific rules.

TABLE 9

| IE/Group Name | Presence | Range | IE type and reference | Semantics description |
|---|---|---|---|---|
| RIC style ID | M | INTEGER (1~256) | | 129~256 is reserved for the operator-specific style ID. |

Table 9 is an example of an RIC STYLE ID. The RIC STYLE ID defined in the conventional O-RAN was available only for an E2 service model defined in the standard. The RIC STYLE ID of Table 9 defines a range of 128 to 256 as a range for an operator-specific use, and enables the definition and use of a specific operator or operator's unique function. For example, the RIC STYLE ID of Table 9 may indicate an operator-specific service model by replacing, or being used in parallel with, various TYPE fields of Table 1 to Table 8 described above.

In the examples of Table 1 to Table 9 above, values of 129 to 256 among values of a type field or style ID field were allocated for an operator-specific message. However, according to an embodiment, a range of the values of the type field or style ID field for the operator-specific message may vary. Also, according to an embodiment, the values for the operator-specific message may be defined as discontinuous values rather than continuous values. In an embodiment, values corresponding to multiples of a specific number are assigned as values for operator-specific messages, or values having a least significance bit (LSB) of a specific value or a most significant bit (MBS) of a specific value when expressed in binary or hexadecimal may be assigned as the values for the operator-specific messages.

As described above, information on a service defined in the standard as well as information on a provider-specific defined service may be transmitted and received through the E2 message. In this case, examples of operator-specific E2SM are as follows. In order for the operator to support a RAN resource control that is based on a network slice ID not specified in the 3GPP standard in an O-RAN, it is possible to request the development of an E2 node xApp to a vendor, based on an operator-specific E2SM. In order to develop a non-standard function, the vendor may set the type of an E2SM function illustrated by way of non-limiting example below as an operator-specific type. A corresponding relationship between each E2SM function and a message is shown in [Table 10] below.

TABLE 10

| RAN Function specific E2SM Information Elements |
|---|
| RIC Event Trigger Definition (table 1) |
| RIC Action Definition (table 2) |
| RIC Indication Header (table 3) |
| RIC Indication Message (table 4) |
| RIC Call Process ID (table 7) |
| RIC Control Header (table 5) |
| RIC Control Message (table 6) |
| RAN Function Description (table 8) |

For the network slice ID-based RAN resource control, an E2 node may use POLICY, CONTROL, and REPORT among POLICY, CONTROL, REPORT, and INSERT services specified in the O-RAN standard. The E2 node may forward the operator-specific E2SM function supported by the E2 node, to the RIC, using the RAN FUNCTION DESCRIPTION defined in [Table 8] in the E2 interface setting operation. For example, the E2 node may set an RAN Function Definition Type defined in [Table 11] below, by a value (e.g., 129) assigned as the operator-specific type.

TABLE 11

| IE/Group Name |
|---|
| RAN Function Name |
| RAN Function Definition Type |
| Sequence of Event trigger styles |
| >RIC Style ID |
| >RIC Style Name |
| Sequence of Report styles |
| >RIC Style ID |
| >RIC Style Name |
| >Sequence of parameters |
| >>RIC Parameter ID |
| >>RIC Parameter Name |
| >>RIC Parameter Type |
| Sequence of Insert styles |
| >RIC Style ID |
| >RIC Style Name |
| >Sequence of parameters |
| >>RIC Parameter ID |
| >>RIC Parameter Name |
| >>RIC Parameter Type |
| Sequence of Control styles |
| >RIC Style ID |
| >RIC Style Name |
| >Sequence of parameters |
| >>RIC Parameter ID |
| >>RIC Parameter Name |
| >>RIC Parameter Type |
| Sequence of Policy styles |
| >RIC Style ID |
| >RIC Style Name |
| >Sequence of parameters |
| >>RIC Parameter ID |
| >>RIC Parameter Name |
| >>RIC Parameter Type |

Using a message defined according to various embodiments, the E2 node or the RIC may set an actual RIC parameter value of the E2SM by a parameter desired by the operator. In an embodiment, in the case of the network slice ID-based RAN resource control not presented in the standard, the E2 node or the RIC may set a desired RIC parameter value by a value desired by the operator, and may set an RAN function name.

POLICY SERVICE is forwarded from the RIC to the E2 node through an E2AP subscription message. The E2AP subscription message forwards the RIC Event Trigger Definition of Table 1. In this case, the RIC Event Trigger Definition is set as a value indicating a subscriber specific type. For example, 10 in [Table 12] below, an RIC EVENT TRIGGER DEFINITION TYPE value may be set as 129, and an RIC Style ID value may be set as 1, and an RIC Parameter Type may be set as Integer, and a Sequence of Trigger Conditions may be set as RIC Parameter ID (NS-SAI) is equal to '100'. E2-SM-IE is a value presented by the E2 node that is actually required by the operator, and is possible to set all values such as a value standardized in the standard or a value non-standardized in the standard, etc.

TABLE 12

| IE/Group Name | Presence | Range | IE type and reference | Semantics description |
|---|---|---|---|---|
| RIC EVENT TRIGGER DEFINITION TYPE | M | 1 ... <maxofType> | | Type number 129~256 is reserved for the operator-specific use. |
| RIC Style ID | M | | 8.3.3 | |
| RIC Parameter Type | M | | 8.3.5 | |
| Sequence of Trigger Conditions | | 0 ... <maxofTGC> | | |
| >RIC Parameter ID | M | | 8.3.6 | |
| >RIC Parameter Test Condition | O | | 8.3.7 | |
| >RIC Parameter Value E2-SM-IE | O | | 8.3.8 | |

In an example of [Table 13] below, a CommonRadioResourceUsage value is a value non-standardized in the current 3GPP standard.

TABLE 13

| IE/Group Name | Presence | Range | IE type and reference | Semantics description | Criticality | Assigned Criticality |
|---|---|---|---|---|---|---|
| Message Type | M | | | | YES | reject |
| DU ID | M | | | DU ID to distinguish DU | YES | reject |
| CellResourceReportList | | 1 | | | YES | reject |
| >CellResourceReportItem | | 1 ... <maxCellingNBDU(=512)> | | | — | |
| >>Cell Global ID | M | | Refer to Cell Global ID definition in NGAP/XnAP | NR CGI | YES | reject |
| >>>>CommonRadioResourceUsage | O | | 0 ... 100 | Radio Usage for non-slice specific operation, (e.g., common control channel, paging, etc.) % | — | |

The E2 node having performed a non-standard operation desired by the operator may report the execution result of a non-standard function to the RIC using an RIC indication message (e.g., Table 4) and an RIC indication header (e.g., Table 3). In this case, a value of an RIC INDICATION HEADER TYPE is set as a value (e.g., 129) allocated for operator-specific information, and an updated value of a value of Table 13 is forwarded. A value of an RIC INDICATION MESSAGE Type is set as a value (e.g., 129) allocated for the operator-specific information, and the E2 node forwards a non-standard message to the RIC using an RAN container.

According to various example embodiments of the present disclosure, a method for operating a apparatus which uses an interface between a radio access network intelligent controller (RIC) and a node including a base station in a radio access network may include: providing first information related with an RIC service, providing second information indicating the type of a message to be used for transmitting the first information, and transmitting the message including the first information and the second information.

In accordance with an example embodiment, the type of the message may be determined according to the RIC service related to the first information.

In accordance with an example embodiment, the type of the message may correspond to a format of the first information.

In accordance with an example embodiment, the type of the message may belong to a first range including values for indicating a message format defined in the standard, or belong to a second range including values for indicating a message format defined for an operator.

In accordance with an example embodiment, the node including the base station may be one of a digital unit (DU), a central unit (CU)—control plane (CP), and a CU—user plane (UP).

According to various example embodiments of the present disclosure, a method for operating a apparatus which uses an interface between a radio access network intelligent controller (RIC) and a node including a base station in a radio access network may include: receiving a message including first information related to an RIC service, identifying the type of the message, based on second information indicating the type of the message included in the message, and acquiring the first information, based on the second information.

In accordance with an example embodiment, the type of the message may be determined according to the RIC service related to the first information.

In accordance with an example embodiment, the type of the message may correspond to a format of the first information.

In accordance with an example embodiment, the type of the message may belong to a first range including values for indicating a message format defined in the standard, or belong to a second range including values for indicating a message format defined for an operator.

In accordance with an example embodiment, the node including the base station may be one of a digital unit (DU), a central unit (CU)—control plane (CP), and a CU—user plane (UP).

According to various example embodiments of the present disclosure, a apparatus configured to use an interface between a radio access network intelligent controller (RIC) and a node including a base station in a radio access network may include a transceiver, and at least one processor connected to the transceiver. The at least one processor may be configured to control the apparatus to: provide first information related to an RIC service, provide second information indicating the type of a message to be used for forwarding the first information, and transmit the message including the first information and the second information.

In accordance with an example embodiment, the type of the message may be determined according to the RIC service related to the first information.

In accordance with an example embodiment, the type of the message may correspond to a format of the first information.

In accordance with an example embodiment, the type of the message may belong to a first range including values for indicating a message format defined in the standard, or belong to a second range including values for indicating a message format defined for an operator.

In accordance with an example embodiment, the node including the base station may be one of a digital unit (DU), a central unit (CU)—control plane (CP), and a CU—user plane (UP).

According to various example embodiments of the present disclosure, a apparatus configured to use an interface between a radio access network intelligent controller (RIC) and a node including a base station in a radio access network may include a transceiver, and at least one processor connected to the transceiver. The at least one processor may be configured to control the apparatus to: receive a message including first information related to an RIC service, identify the type of the message, based on second information indicating the type of the message included in the message, and acquire the first information, based on the second information.

In accordance with an example embodiment, the type of the message may be determined according to the RIC service related to the first information.

In accordance with an example embodiment, the type of the message may correspond to a format of the first information.

In accordance with an example embodiment, the type of the message may belong to a first range including values for indicating a message format defined in the standard, or belong to a second range including values for indicating a message format defined for an operator.

In accordance with an example embodiment, the node including the base station may be one of a digital unit (DU), a central unit (CU)—control plane (CP), and a CU—user plane (UP).

Methods of embodiments described in claims or specification of the present disclosure may be implemented in the form of hardware, software, or a combination of hardware and software.

When the methods are implemented in software, a non-transitory computer-readable storage medium storing one or more programs (e.g., software modules) may be presented. One or more programs stored in the computer-readable storage medium are configured to be executable by one or more processors in an electronic device. One or more programs include instructions for enabling the electronic device to execute the methods of embodiments described in claims or specification of the present disclosure.

These programs (e.g., software modules, software) may be stored in a random access memory, a non-volatile memory including a flash memory, a read only memory (ROM), an electrically erasable programmable ROM (EEPROM), a magnetic disc storage device, a compact disc-ROM (CD-ROM), digital versatile discs (DVDs), or an optical storage device of other forms, and/or a magnetic cassette. Or, they may be stored in a memory including a combination of some or all thereof. Also, each configuration memory may be included in plurality as well.

The program may be stored in an attachable storage device that may be accessed through a communication network such as the Internet, an intranet, a local area network (LAN), a wide area network (WAN), or a storage area network (SAN), or a communication network including a combination thereof. This storage device may be connected to a device performing an embodiment of the present disclosure through an external port. Also, a separate storage device on the communication network may be connected to a device performing an embodiment of the present disclosure as well.

In the aforementioned example embodiments of the present disclosure, components included in the disclosure have been expressed in the singular or plural according to various example embodiments presented. However, the singular or plural expression is selected appropriately for context presented for convenience, and the present disclosure is not limited to the singular or plural component, and even if the component is expressed in the plural, includes the singular, or even if the component is expressed in the singular, it may include the plural.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. A method for an apparatus configured to use an interface between a radio access network intelligent controller (RIC) and a E2 node including a base station in a radio access network, the method comprising:
generating information related with an RIC service;
generating value indicating a type of a message to be used for transmitting the information; and
transmitting an E2 message comprising the information and the value,
wherein,
in case that the value indicates a first type, the E2 message includes a predetermined information element fields included in a predefined message format,
in case that the value indicates a second type, the E2 message includes at least a part of the predetermined information element fields included in the predefined message format and at least one additional field in a message format defined by an operator,
wherein the value belongs to either a first ran e or a se d range and wherein a value indicating the first type belongs to a first range comprising values indicating the predefined message format, and a value indicating the second type belongs to a second range comprising values indicating the message format defined by the operator.

2. The method of claim 1, wherein the type of the message is determined based on the RIC service related to the first information.

3. The method of claim 1, wherein the type of the message corresponds to a format of the first information.

4. The method of claim 1, wherein the predefined message format is defined in the standard.

5. The method of claim 1, wherein the E2 node including the base station is one of a digital unit (DU), a central unit (CU)-control plane (CP), and a CU-user plane (UP).

6. A method for an apparatus configured to use an interface between a radio access network intelligent controller (RIC) and a E2 node including a base station in a radio access network, the method comprising:
receiving a message comprising information related to an RIC service;
identifying a type of the message, based on a value indicating the type of the message included in the message; and
acquiring the first information, based on the values
wherein,
in case that the value indicates a first type, the E2 message includes predetermined information element fields included in a predefined message format,
in case that the value indicates a second type, the E2 message includes at least a part of the predetermined information element fields included in the predefined message format and at least one additional field in a message format defined by an operator,
wherein the value belongs to either a first range or a second range, and
wherein a value indicating the first type belongs to a first range comprising values indicating the predefined message format, and a value indicating the second type belongs to a second range comprising values indicating the message format defined by the operator.

7. The method of claim 6, wherein the type of the message is determined based on the RIC service related to the first information.

8. The method of claim 6, wherein the type of the message corresponds to a format of the first information.

9. The method of claim 6, wherein the predefined message format is defined in the standard.

10. The method of claim 6, wherein the node including the base station is one of a digital unit (DU), a central unit (CU)-control plane (CP), and a CU-user plane (UP).

11. An apparatus configured to use an interface between a radio access network intelligent controller (RIC) and a node including a base station in a radio access network, the apparatus comprising:
a transceiver; and
at least one processor, comprising processor circuitry, connected to the transceiver,
wherein the at least one processor is configured, individually and/or collectively, to control the apparatus to:
generate information related with an RIC service;
generate a value indicating a type of a message to be used for transmitting the first-information; and
transmit an E2 message comprising the first-information and the value,
wherein,
in case that the value indicates a first type, the E2 message includes a-predetermined information element fields included in a predefined message format,
in case that the value indicates a second type, the E2 message includes at least a part of the predetermined information element fields included in the predefined message format and at least one additional field in a message format defined by an operator,
wherein the value belongs to either a first range or a second range, and
wherein a value indicating the first type belongs to a first range comprising values indicating the predefined message format, and a value indicating the second type belongs to a second range comprising values indicating the message format defined by the operator.

12. The apparatus of claim 11, wherein the type of the message is determined based on the RIC service related to the first information.

13. The apparatus of claim 11, wherein the type of the message corresponds to a format of the first information.

14. The apparatus of claim 11, wherein the predefined message format is defined in the standard.

15. The apparatus of claim 11, wherein the node including the base station is one of a digital unit (DU), a central unit (CU)-control plane (CP), and a CU-user plane (UP).

16. The method of claim 1, wherein for the second type message the at least one additional field is defined by or configured specifically for an operator.

17. The method of claim 6, wherein for the second type message the at least one additional field is defined by or configured specifically for an operator.

18. The apparatus of claim 11, wherein for the second type message the at least one additional field is defined by or configured specifically for an operator.

* * * * *